(12) United States Patent
Nagao et al.

(10) Patent No.: US 11,788,604 B2
(45) Date of Patent: Oct. 17, 2023

(54) PLANETARY GEAR MECHANISM AND ROTARY MECHANICAL SYSTEM

(71) Applicant: MITSUBISHI HEAVY INDUSTRIES COMPRESSOR CORPORATION, Tokyo (JP)

(72) Inventors: Hideki Nagao, Hiroshima (JP); Hiroyuki Miyata, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/936,198

(22) Filed: Sep. 28, 2022

(65) Prior Publication Data

US 2023/0099357 A1    Mar. 30, 2023

(30) Foreign Application Priority Data

Sep. 30, 2021    (JP) .................................. 2021-161323

(51) Int. Cl.
| F16H 1/28 | (2006.01) |
| F16H 57/08 | (2006.01) |
| F16H 55/06 | (2006.01) |

(52) U.S. Cl.
CPC .............. *F16H 1/28* (2013.01); *F16H 57/08* (2013.01); *F16H 55/06* (2013.01)

(58) Field of Classification Search
CPC . F16H 1/28; F16H 57/08; F16H 55/06; F16H 1/08; F16H 1/22; F16H 1/06
See application file for complete search history.

(56) References Cited

U.S. PATENT DOCUMENTS

| 8,905,887 | B2 * | 12/2014 | Coles ................... F01D 17/162 |
| | | | 475/331 |
| 10,018,119 | B2 * | 7/2018 | Kupratis ................... F02C 7/36 |
| 10,619,717 | B2 * | 4/2020 | Modrzejewski ........ F16H 55/06 |
| 2016/0017793 | A1 * | 1/2016 | Johnson ................... F02B 39/04 |
| | | | 417/423.1 |
| 2017/0218963 | A1 | 8/2017 | Kobayashi et al. |
| 2019/0154127 | A1 * | 5/2019 | Boccadamo ......... H02K 49/046 |

FOREIGN PATENT DOCUMENTS

| DE | 102009018409 A1 * | 10/2010 | ............. F16H 55/06 |
| JP | 2020-190306 A | 11/2020 | |
| WO | WO-9709514 A1 * | 3/1997 | ............. F16H 55/06 |
| WO | 2016/042639 A1 | 3/2016 | |
| WO | WO-2020187989 A1 * | 9/2020 | ............... B60K 1/00 |

* cited by examiner

*Primary Examiner* — Tinh Dang
(74) *Attorney, Agent, or Firm* — Osha Bergman Watanabe & Burton LLP

(57) ABSTRACT

A planetary gear mechanism includes a sun gear rotatable about an axis, a first shaft that is fixed to the sun gear and is rotatable integrally with the sun gear, a plurality of planetary gears that mesh with the sun gear and are rotatable about a center line thereof parallel to the axis, an internal gear that includes internal teeth facing inside in a radial direction to mesh with the planetary gears and is rotatable about the axis, a second shaft that extends in the axial direction to be connected to the internal gear and rotates about the axis together with the internal gear, and a reinforcing member that is fixed to an outer peripheral surface of the internal gear and is formed in an annular shape of a material having a higher specific strength than that of a material forming the internal gear.

5 Claims, 6 Drawing Sheets

PLANETARY GEAR MECHANISM AND ROTARY MECHANICAL SYSTEM

BACKGROUND OF THE INVENTION

Field of the Invention

The present disclosure relates to a planetary gear mechanism and a rotary mechanical system.

Priority is claimed on Japanese Patent Application No. 2021-161323, filed on Sep. 30, 2021, the content of which is incorporated herein by reference.

Description of Related Art

Some compressors that generate various types of compressed fluids, such as axial-flow compressors and centrifugal compressors, are driven by a driving machine (motor). For example, Patent Document 1 discloses a compressor system in which a compressor is driven by a driving machine. In the configuration described in Patent Document 1, the compressor is connected via a speed increaser connected to the driving machine.

[Patent Document 1] PCT International Publication No. WO 2016/042639

SUMMARY OF THE INVENTION

When a compressed fluid generating compressor is rotated at a high speed of, for example, tens of thousands of rpm, a planetary gear mechanism is often used as the speed increaser. The speed increasing planetary gear mechanism mainly includes an internal gear, a plurality of planetary gears, and a sun gear. The internal gear is connected to an input shaft and includes internal teeth facing inside in a radial direction. The plurality of planetary gears is disposed inside the internal gear in the radial direction and in a state of meshing with the internal teeth of the internal gear. The sun gear connected to an output shaft is disposed inside the plurality of planetary gears in the radial direction. The sun gear is disposed in a state of meshing with the plurality of planetary gears. In such a planetary gear mechanism, when the output shaft is rotated at a high speed, the internal gear having a cylindrical shape also rotates at a high speed. Since the internal gear has a cylindrical shape, a centrifugal force deforms the internal gear to expand outward in the radial direction during high-speed rotation. When the internal gear deforms, a defect occurs in a state where the internal gear and the plurality of planetary gears mesh with each other.

The present disclosure provides a planetary gear mechanism and a rotary mechanical system that effectively suppress deformation caused by a centrifugal force of an internal gear and can respond to rotation at a high speed.

According to an aspect of the present disclosure, a planetary gear mechanism is provided including a sun gear that is rotatable about an axis, a first shaft that extends in an axial direction, is fixed to the sun gear, and is rotatable about the axis with the sun gear, wherein the axial direction is a direction in which the axis extends, a plurality of planetary gears that mesh with the sun gear and are rotatable about a center line of each of the planetary gears parallel to the axis, an internal gear that is disposed outside in a radial direction with respect to the plurality of planetary gears, includes internal teeth facing inside in the radial direction and mesh with each of the planetary gears, and is rotatable about the axis, a second shaft that extends in the axial direction, is connected to the internal gear, and rotates about the axis in unison with the internal gear, and a reinforcing member that is fixed to an outer peripheral surface of the internal gear and is formed in an annular shape of a material having a higher specific strength than a specific strength of a material forming the internal gear.

The rotary mechanical system according to the present disclosure includes the planetary gear mechanism described above and the rotary machine connected to any one of the first shaft and the second shaft.

In the planetary gear mechanism and the rotary mechanical system of the present disclosure, deformation caused by centrifugal force of the internal gear can be effectively suppressed, and rotation at a high speed can be responded.

DETAILED DESCRIPTION OF THE INVENTION

Hereinafter, embodiments in which a planetary gear mechanism and a rotary mechanical system according to the present disclosure are implemented will be described with reference to the accompanying drawings. However, the present disclosure is not limited to these embodiments.

Configuration of Rotary Mechanical System

Figure 1:
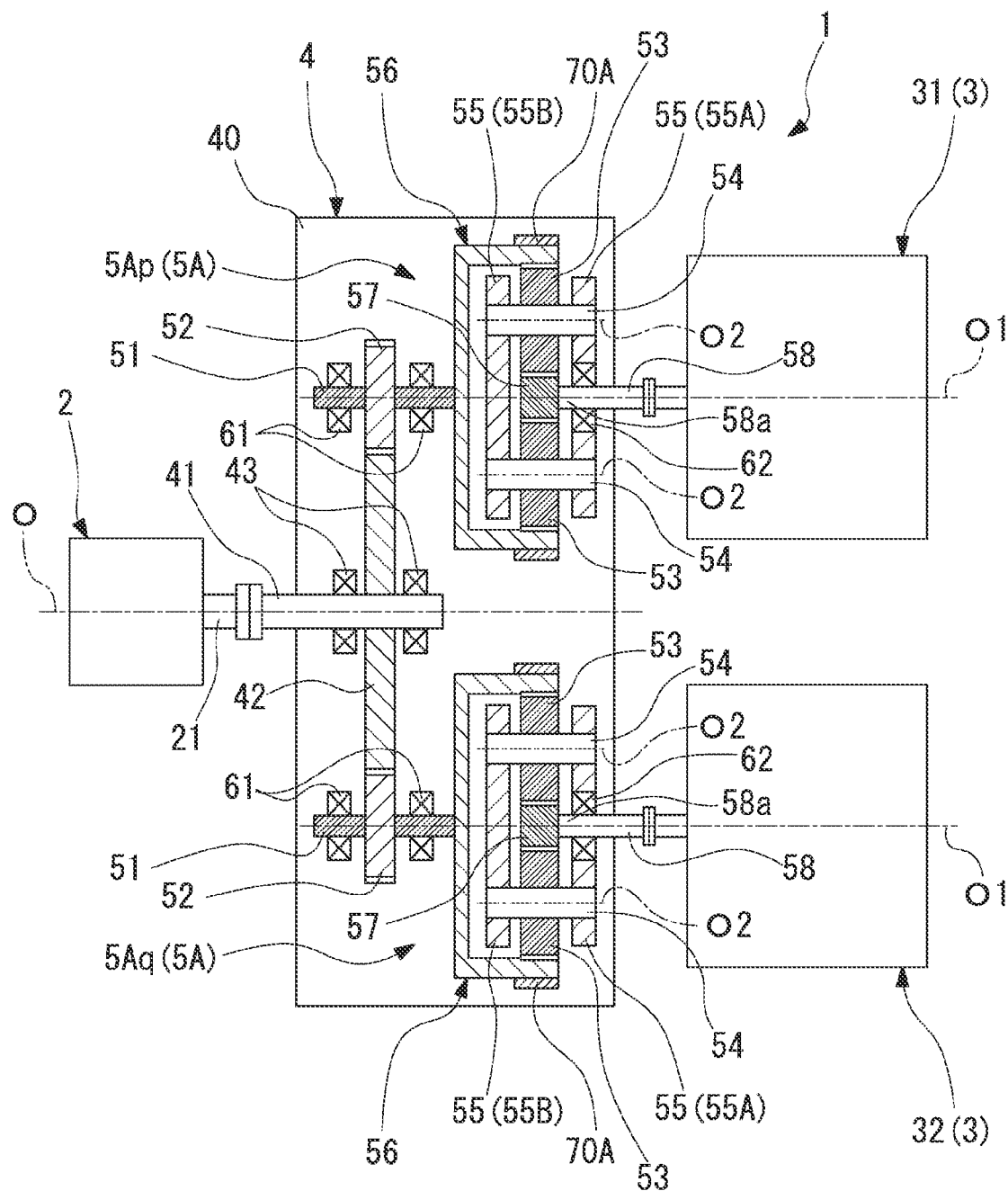
FIG. 1 is a schematic view showing a schematic configuration of a rotary mechanical system according to a first embodiment of the present disclosure.

In a rotary mechanical system 1, one driving machine 2 operates a plurality of compressors 3 at a high speed. In the rotary mechanical system 1, the plurality of compressors 3 are arranged on the same side with respect to the driving machine 2, and the plurality of compressors 3 are coupled in parallel to the one driving machine 2. As shown in FIG. 1, the rotary mechanical system 1 of the present embodiment includes the driving machine 2, the plurality of compressors (rotary machines) 3, and a transmission mechanism 4. In the rotary mechanical system 1 of the present embodiment, only one driving machine 2 is disposed.

The driving machine 2 is rotationally driven to generate power for driving the compressor 3. The driving machine 2 has a drive shaft 21 that rotates about a main axis O. Only one drive shaft 21 is disposed. The drive shaft 21 is formed in a columnar shape centered on the main axis O. The driving machine 2 of the present embodiment is a motor that drives the drive shaft 21. As the driving machine 2, a steam turbine or the like can be adopted in addition to the motor as long as the power for driving the compressor 3 can be generated.

The compressor 3 compresses a gas as a working fluid. The compressor 3 uses an impeller (not shown) disposed inside each compressor to compress a gas having a molecular weight of 10 or less. The compressor 3 of the present embodiment is a uniaxial multi-stage centrifugal compressor that compresses a hydrogen gas. As the compressor 3 of the present embodiment, three compressors are used, i.e., a first compressor 31, a second compressor 32, and a third compressor (not shown). The first compressor 31, the second compressor 32, and the third compressor are connected in this order via a pipe (not shown). In the rotary mechanical system 1, the gas to be compressed is introduced in the order of the first compressor 31, the second compressor 32, and the third compressor and is sequentially compressed. The gas is compressed in the third compressor and then is supplied to an external supply destination of the rotary mechanical system 1. The plurality of compressors 3 are not limited to being coupled to each other. The plurality of compressors 3 may be disposed in parallel so that the compressors can be separated from each other and operate independently.

Configuration of Transmission Mechanism

The transmission mechanism 4 increases the speed of the rotation of the drive shaft 21 and transmits the rotation to the plurality of compressors 3. The transmission mechanism 4 connects one drive shaft 21 and the plurality of compressors 3 to each other. During a rated operation of the compressor 3, the transmission mechanism 4 rotates a sun shaft 58 (to be described below) so that the rotation speed of the sun shaft increases to approximately 10,000 (rotation/min) or more and 100,000 (rotation/min) or less. The transmission mechanism 4 includes a casing 40, a main shaft 41, a main gear 42, a main shaft bearing 43, and a plurality of planetary gear mechanisms 5A.

The casing 40 constitutes the exterior of the transmission mechanism 4. The casing 40 internally accommodates the main shaft 41, the main gear 42, the main shaft bearing 43, and the plurality of planetary gear mechanisms 5A.

The main shaft 41 rotates together with the drive shaft 21. The main shaft 41 transmits the rotation of the drive shaft 21 to the plurality of planetary gear mechanisms 5A via the main gear 42. The main shaft 41 is connected to an end portion of the drive shaft 21 outside the casing 40. The main shaft 41 is rotationally driven about the main axis O by the drive shaft 21. The main shaft 41 is formed in a columnar shape centered on the main axis O. In other words, the main shaft 41 is disposed to be coaxial with the drive shaft 21. The main shaft 41 passes through the casing 40 so that a tip of the main shaft is disposed in the casing 40.

The main gear 42 is fixed to the main shaft 41 in the casing 40. The main gear 42 is an external gear formed in a disk shape centered on the main axis O. Although the main gear 42 of the present embodiment has the largest outer diameter among the gears used in the transmission mechanism 4, the main gear 42 is not limited to having the largest outer diameter among the gears used in the transmission mechanism 4.

The main shaft bearing 43 rotatably supports the main shaft 41 with respect to the casing 40. The main shaft bearing 43 is fixed inside the casing 40. The main shaft bearing 43 of the present embodiment is a journal bearing.

A pair of main shaft bearings 43 is disposed with respect to the main shaft 41 so that the main gear 42 is interposed therebetween.

Configuration of Planetary Gear Mechanism

The plurality of planetary gear mechanisms 5A are gear mechanisms disposed inside the casing 40 to surround the main shaft 41. Each planetary gear mechanism 5A is connected to one corresponding compressor 3 in a one-to-one relationship. Each planetary gear mechanism 5A transmits the rotation of the main shaft 41 to one corresponding compressor 3. In the present embodiment, three planetary gear mechanisms, i.e., a first planetary gear mechanism 5Ap connected to the first compressor 31, a second planetary gear mechanism 5Aq connected to the second compressor 32, and a third planetary gear mechanism (not shown) connected to the third compressor are disposed to be evenly spaced apart from each other in the casing 40. In the present embodiment, the first planetary gear mechanism 5Ap, the second planetary gear mechanism 5Aq, and the third planetary gear mechanism (not shown) have the same configuration.

Figure 2:
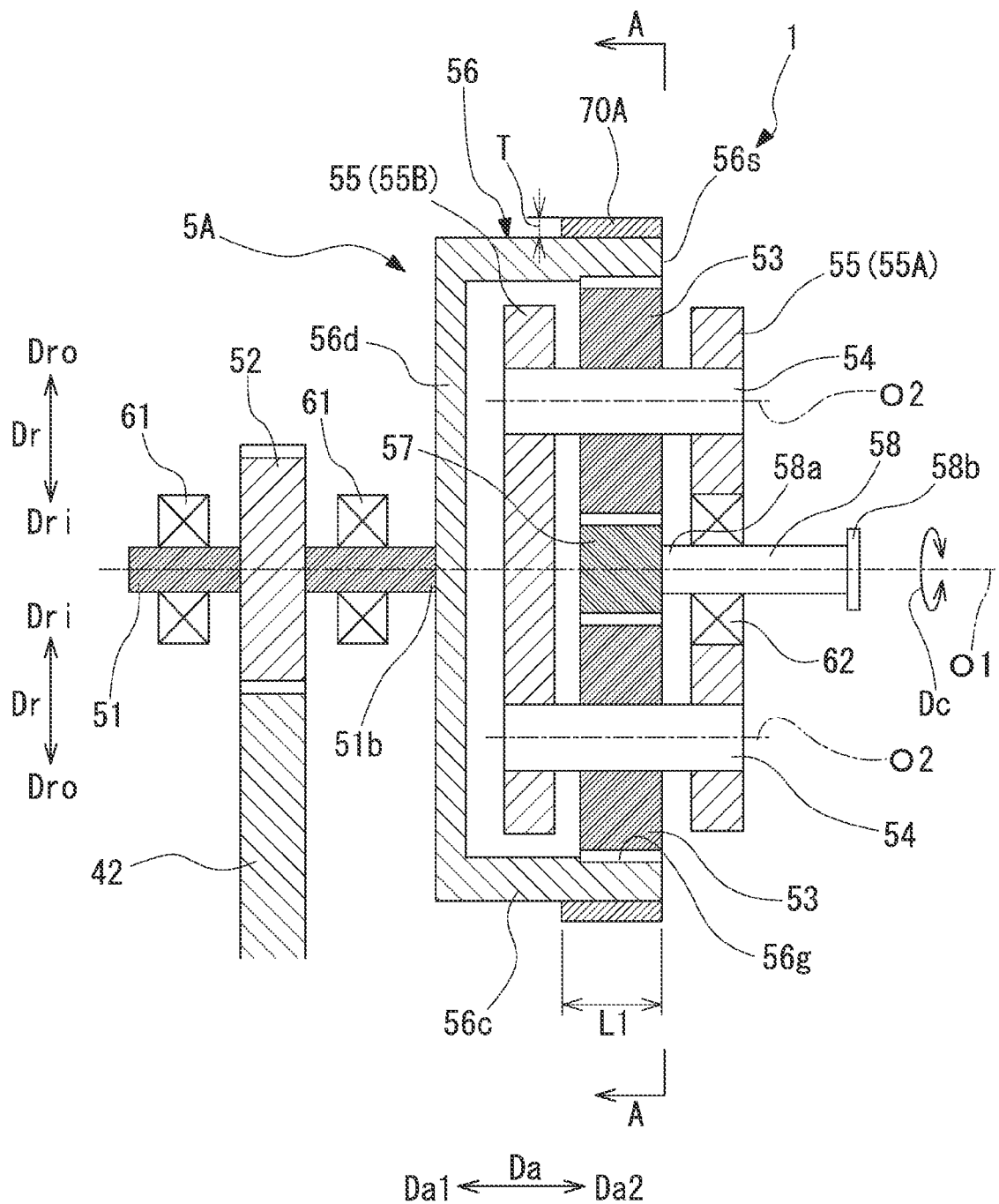
FIG. 2 is an enlarged view of a main portion of a compressor system showing a planetary gear mechanism of the first embodiment.

As shown in FIG. 2, each planetary gear mechanism 5A in the present embodiment includes an auxiliary shaft (second shaft) 51, an auxiliary gear 52, a plurality of planetary gears 53, a plurality of planetary gear shafts 54, a gear support portion 55, an internal gear 56, a sun gear 57, a sun shaft (first shaft) 58, a first bearing 61, a second bearing 62, and a reinforcing member 70A.

The rotation of the main shaft 41 is transmitted to the auxiliary shaft 51, and the auxiliary shaft 51 rotates together with the main shaft 41. The auxiliary shaft 51 is formed in a columnar shape centered on a first central axis (axis) O1 extending parallel to the main axis O. The auxiliary shaft 51 is disposed at a position spaced apart from the main shaft 41 to the outside in a radial direction of the main shaft 41. The auxiliary shaft 51 extends parallel to the main shaft 41. The auxiliary shaft 51 rotates about the first central axis O1 as the main shaft 41 rotates.

The auxiliary gear 52 meshes with the main gear 42. The auxiliary gear 52 is fixed to the auxiliary shaft 51. The auxiliary gear 52 is an external gear formed in a disk shape centered on the first central axis O1. The auxiliary gear 52 of the present embodiment has an outer diameter smaller than that of the main gear 42. The auxiliary gear 52 is not limited to having the outer diameter smaller than that of the main gear 42. For example, the auxiliary gear 52 may have the same diameter as that of the main gear 42.

Figure 3:
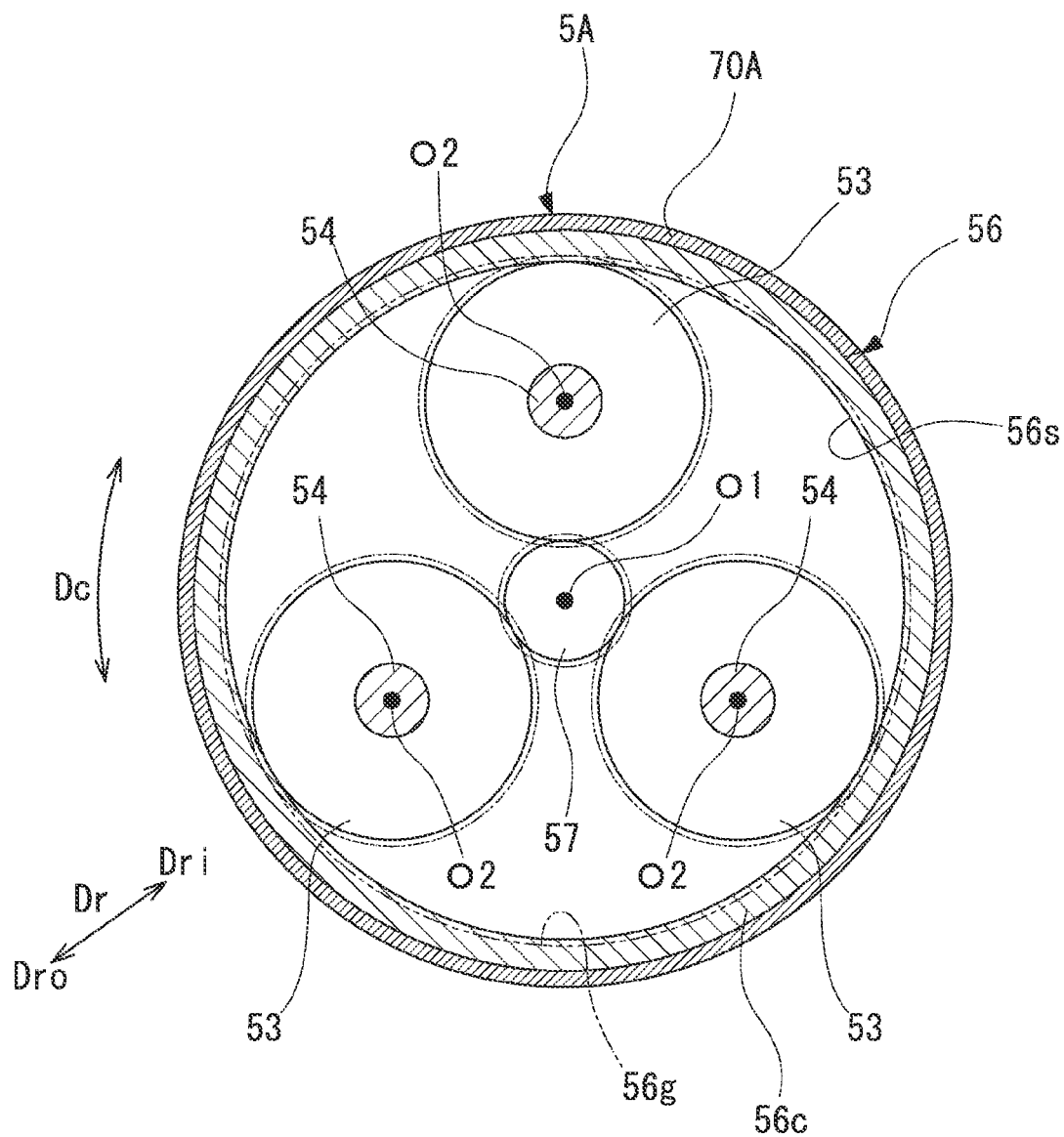
FIG. 3 is a cross-sectional view taken along line A-A of FIG. 1.

The rotation of the auxiliary shaft 51 is transmitted to the plurality of planetary gears 53 via the internal gear 56, and the plurality of planetary gears 53 rotate together with the rotation of the auxiliary shaft 51. As shown in FIGS. 2 and 3, the plurality of planetary gears 53 are disposed on an outside Dro in a radial direction Dr of the auxiliary shaft 51 with respect to the auxiliary shaft 51. The radial direction Dr is a radial direction of the auxiliary shaft 51 or the sun shaft 58 centered on the first central axis O1. The plurality of planetary gears 53 are disposed at intervals to each other in a circumferential direction Dc of the sun shaft 58. The circumferential direction Dc is a circumferential direction of the auxiliary shaft 51 or the sun shaft 58 centered on the first central axis O1. The plurality of planetary gears 53 mesh with the internal gear 56 and the sun gear 57. In the present embodiment, the three planetary gears 53 are disposed to be evenly spaced apart from each other in the circumferential direction Dc. The number of planetary gears 53 is not limited to three, but may be one or more, and four or more may be disposed. Each planetary gear 53 is an external gear formed in a disk shape centered on a second central axis (center line) O2. The plurality of planetary gears 53 do not revolve, but only rotate about the second central axis O2, which is their own center line.

As shown in FIG. 2, the planetary gear shaft 54 rotates together with the planetary gear 53. The planetary gear shaft 54 is formed in a columnar shape centered on the second central axis O2 extending parallel to the main axis O and the first central axis O1. The planetary gear shaft 54 is disposed at a position spaced apart from the auxiliary shaft 51 to the outside Dro in the radial direction Dr of the auxiliary shaft 51. The planetary gear shaft 54 extends parallel to the main shaft 41 and the auxiliary shaft 51. The planetary gear shaft 54 supports the planetary gear 53 to be rotatable about the second central axis O2.

The gear support portion 55 supports the plurality of planetary gears 53 to be rotatable. The gear support portion 55 of the present embodiment has a first gear support portion 55A and a second gear support portion 55B. Specifically, the first gear support portion 55A and the second gear support portion 55B are planetary carriers that support both ends of the plurality of planetary gear shafts 54 to be rotatable about the second central axis O2. The first gear support portion 55A and the second gear support portion 55B maintain mutual positions of the plurality of planetary gear shafts 54 so that the plurality of planetary gear shafts 54 do not move. The first gear support portion 55A is fixed to the casing 40 in a non-movable state. The second gear support portion 55B is not fixed to the casing 40.

As shown in FIG. 2, the internal gear 56 is fixed to an end portion 51*b* of the auxiliary shaft 51. The internal gear 56 is formed in a bottomed cylindrical shape centered on the first central axis O1. Specifically, the internal gear 56 has an opening end 56*s* at one end (end portion on a side not fixed to the auxiliary shaft 51) on a second side Da2 in an axial direction Da. The internal gear 56 is rotatable about the first central axis O1 by rotating together with the auxiliary shaft 51. The internal gear 56 meshes with the plurality of planetary gears 53 accommodated therein from the outside Dro in the radial direction Dr. The internal gear 56 integrally has a cylindrical portion 56*c* and a disk-shaped portion 56*d*.

The disk-shaped portion 56*d* extends from the end portion 51*b* of the auxiliary shaft 51 to the outside Dro in the radial direction Dr. The disk-shaped portion 56*d* is a member having a disk shape centered on the first central axis O1. The disk-shaped portion 56*d* forms a bottom portion at an end portion of the internal gear 56 on a first side Da1 in the axial direction Da which is a direction in which the first central axis O1 extends.

The cylindrical portion 56*c* extends from an outer peripheral portion of the disk-shaped portion 56*d* toward the second side Da2 in the axial direction Da parallel to the first central axis O1. The cylindrical portion 56*c* has a cylindrical shape centered on the first central axis O1. An end portion of the cylindrical portion 56*c* on the first side Da1 in the axial direction Da is closed by the disk-shaped portion 56*d*. Only an end portion of the cylindrical portion 56*c* on the second side Da2 in the axial direction Da is the opening end 56*s* opening toward the second side Da2 in the axial direction Da.

The cylindrical portion 56*c* is disposed on the outside Dro of the plurality of planetary gears 53 in the radial direction Dr. The internal gear 56 includes, on an inner peripheral surface of the cylindrical portion 56*c*, which faces an inside Dri in the radial direction Dr, internal teeth 56*g* that mesh with the plurality of planetary gears 53. The internal teeth 56*g* are formed, at least in the axial direction Da, in a region facing the plurality of planetary gears 53 in the radial direction Dr. In the internal teeth 56*g*, a plurality of teeth is arranged in an annular shape at intervals in the circumferential direction Dc. The internal teeth 56*g* are formed in the middle of the cylindrical portion 56*c* from the opening end 56*s* toward the disk-shaped portion 56*d* in the axial direction Da. That is, in the present embodiment, the cylindrical portion 56*c* and the plurality of planetary gears 53 mesh with each other in a region from the opening end 56*s* to the middle (position not reaching the disk-shaped portion 56*d*) of the cylindrical portion 56*c* in the axial direction Da.

The internal gear 56 rotates together with the auxiliary shaft 51 to transmit the rotation of the auxiliary shaft 51 to the plurality of planetary gears 53 disposed on the inside Dri in the radial direction Dr. The internal gear 56 is formed of, for example, a metal material such as a steel material and stainless steel.

In the internal gear 56, the cylindrical portion 56*c* in which the internal teeth 56*g* are formed and the disk-shaped portion 56*d* fixed to the auxiliary shaft 51 may be formed by different members. Therefore, the internal gear 56 may have a structure in which the disk-shaped portion 56*d* is configured as a gear and the disk-shaped portion 56*d* and the cylindrical portion 56*c* mesh with each other to rotate. In addition, the internal gear 56 may have a structure in which a plurality of holes is formed in the disk-shaped portion 56*d*. Further, the internal gear 56 may have a straddle shape in which the disk-shaped portion 56*d* is divided into a plurality of members.

The sun gear 57 is an output gear that meshes with the plurality of planetary gears 53 on the inside Dri in the radial direction Dr. The sun gear 57 is an external gear formed in a disk shape centered on the first central axis O1. An outer diameter of the sun gear 57 is smaller than those of the plurality of planetary gears 53. The sun gear 57 is not limited to having a disk shape and may have a cylindrical shape. That is, a thickness of the sun gear 57 is not limited at all. Further, the sun gear 57 is not limited to having the outer diameter smaller than those of the plurality of planetary gears 53. Therefore, the size of the sun gear 57 may be the same as or larger than those of the plurality of planetary gears 53.

The sun shaft 58 extends in the axial direction Da centered on the first central axis O1. The sun shaft 58 is an output shaft in which the sun gear 57 is fixed to an end portion 58*a* (end portion close to the driving machine 2) on the first side Da1 in the axial direction Da. In the sun shaft 58, a rotation shaft of the compressor 3 is connected to an end portion 58*b* (end portion on an opposite side to the end portion close to the driving machine 2) on the second side Da2 in the axial direction Da. The sun shaft 58 rotates about the first central axis O1 together with the sun gear 57 to which the rotation of the planetary gear 53 is transmitted. The sun shaft 58 is formed in a columnar shape centered on the first central axis O1. The axis of the sun shaft 58 coincides with the first central axis O1 of the auxiliary shaft 51. That is, the sun shaft 58 is disposed at a position that is parallel to the drive shaft 21 and that is displaced to the outside Dro in the radial direction Dr. As shown in FIG. 1, the sun shaft 58 passes through the casing 40 so that the end portion 58*a* is disposed in the casing 40. The sun shaft 58 is not limited to the structure that passes through the casing 40 so that the end portion 58*a* is disposed in the casing 40. When a joint is used, the sun shaft 58 may not have a structure passing through the casing 40 as long as the sun shaft is accommodated in the casing 40.

As shown in FIGS. 1 and 2, the first bearing 61 rotatably supports the auxiliary shaft 51 with respect to the casing 40. The first bearing 61 is fixed inside the casing 40. The first bearing 61 of the present embodiment is a journal bearing. The first bearing 61 may be a bearing having the same type and size as the main shaft bearing 43 or may be a bearing having a type and size different from those of the main shaft bearing, as long as the first bearing is a journal bearing. Therefore, the first bearing 61 may be a rolling bearing or a slide bearing. When the first bearing 61 is a slide bearing, for example, the first bearing may be a sleeve type bearing that is not divided in the circumferential direction and is formed in a tubular shape. When the first bearing 61 is a slide bearing, for example, the first bearing may be a tilting pad bearing having a plurality of pads divided in the circumferential direction. A pair of first bearings 61 is disposed with respect to the auxiliary shaft 51 so that the auxiliary gear 52 is interposed.

The second bearing 62 rotatably supports the sun shaft 58 with respect to the casing 40. The second bearing 62 is fixed to the first gear support portion 55A. The second bearing 62 of the present embodiment may be a tilting pad bearing. The second bearing 62 is disposed at a position close to the compressor 3 with respect to the sun gear 57. The second bearing 62 is not limited to the structure fixed to the first gear support portion 55A as long as the second bearing may be in a non-movable state with respect to the casing 40. For example, the second bearing 62 may be directly fixed to the casing 40. Further, the second bearing 62 may be a bearing to which a damping function for damping the vibration of the sun shaft 58 is added.

As shown in FIGS. 2 and 3, the reinforcing member 70A is disposed on the outside Dro of the internal gear 56 in the radial direction Dr. The reinforcing member 70A is fixed to an outer peripheral surface of the cylindrical portion 56c. The reinforcing member 70A is formed in an annular shape to continuously extend the circumferential direction Dc around the first central axis O1. The reinforcing member 70A of the present embodiment has a constant thickness T in the radial direction Dr and the axial direction Da. That is, the reinforcing member 70A is formed in an annular shape having the constant thickness T centered on the first central axis O1.

It is preferable that the reinforcing member 70A is formed in a region where at least part overlaps the plurality of planetary gears 53 in the axial direction Da. In addition, it is preferable to dispose the reinforcing member 70A at a position close to the opening end 56s of the internal gear 56 in the axial direction Da. In the present embodiment, the reinforcing member 70A does not cover the entire region of the outer peripheral surface of the cylindrical portion 56c in the axial direction Da. The reinforcing member 70A is formed to extend only in a region L1 slightly longer than the region overlapping the plurality of planetary gears 53 in the axial direction Da from the opening end 56s of the internal gear 56 toward the first side Da1 in the axial direction Da. That is, the reinforcing member 70A of the present embodiment is formed to overlap, in the axial direction Da, the entire region where the internal gear 56 and the plurality of planetary gears 53 mesh with each other.

The reinforcing member 70A is formed of a material having a higher specific strength than that of a material forming the internal gear 56. Herein, the specific strength is a ratio of a tensile strength with respect to the density of a material (specific strength=tensile strength/density). It is preferable to form the reinforcing member 70A of, for example, a material having a specific strength that is two times or higher that of the material forming the internal gear 56.

A material forming the reinforcing member 70A is preferably, for example, a material having a higher elastic modulus than that of the material forming the internal gear 56. The material forming the reinforcing member 70A is preferably a material having a lower density than that of the material forming the internal gear 56.

Figure 4:
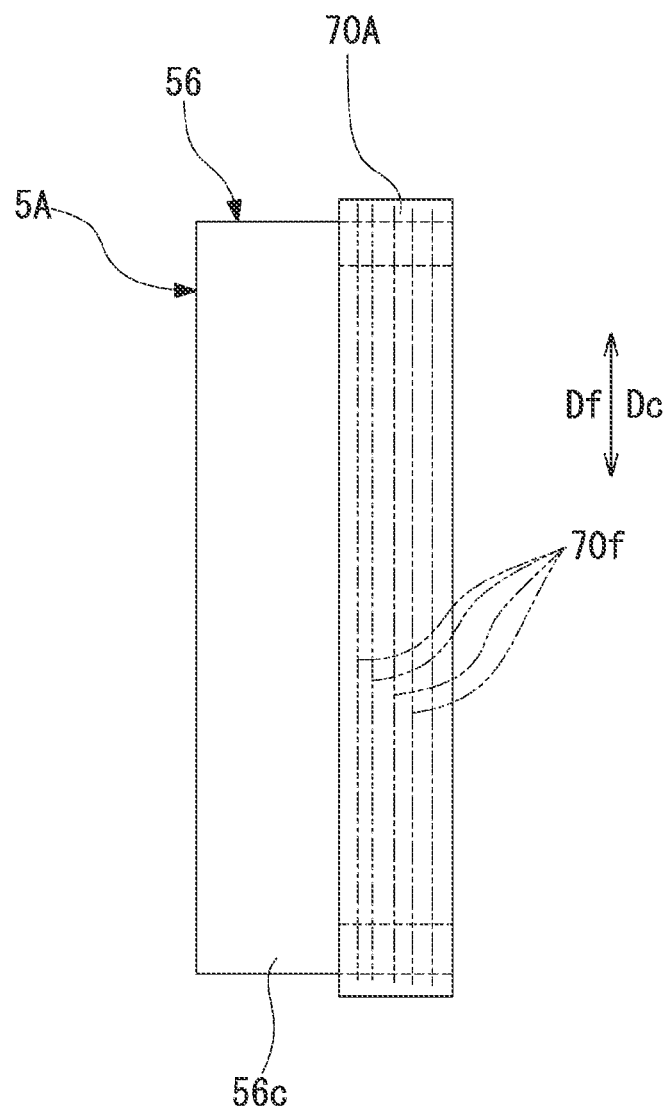
FIG. 4 is a view showing an appearance of an internal gear constituting a planetary gear mechanism in a modification example of the first embodiment.

Specific examples of a material for the reinforcing member 70A satisfying the upper limits include a titanium alloy, an aluminum alloy, and carbon fiber reinforced plastic (CFRP). In particular, in a case where the reinforcing member 70A is formed of the carbon fiber reinforced plastic, as shown in FIG. 4, it is preferable to form the reinforcing member 70A so that a fiber direction Df of a fiber 70f included in the carbon fiber reinforced plastic is, for example, the circumferential direction Dc around the first central axis O1.

Examination on Reinforcing Member

Herein, the reinforcing member 70A when actually rotating the internal gear 56 at a high speed is defined as follows.

A deformation amount (strain) $\varepsilon 1$ of the internal gear 56 rotating at a circumferential speed V (m/s) is expressed by the following equation (1).

$$\varepsilon 1 = \sigma\theta/E1 = \rho 1 \times V2/E1 \quad (1)$$

Herein, $\sigma\theta O$: a circumferential stress of the internal gear 56, E1: the elastic modulus of a material for the internal gear 56, and $\rho 1$: the density of the material for the internal gear 56 are satisfied.

Based on this, when the internal gear 56 rotates at the circumferential speed V (m/s), an internal pressure P acting on the reinforcing member 70A due to the deformation of the internal gear 56 is expressed by the following equation (2).

$$P = t1/r \times \rho 1 \times V2 \quad (2)$$

Herein, t1: the thickness of the internal gear 56 in the radial direction Dr and r: the radius of the internal gear 56 are satisfied.

When the internal pressure P expressed by the equation (2) acts on the reinforcing member 70A, a circumferential stress $\sigma\theta 1$ acting on the reinforcing member 70A from the internal gear 56 is expressed by the following equation (3).

$$\sigma\theta 1 = r/t2 \times t1/r \times \rho 1 \times V2 \quad (3)$$

Herein, t2: the thickness of the reinforcing member 70A in the radial direction Dr is satisfied.

In addition, a circumferential stress $\sigma\theta 2$ caused by a centrifugal force of the reinforcing member 70A that is fixed to the internal gear 56 and rotates at the same circumferential speed V (m/s) as the internal gear 56 is expressed by the following equation (4).

$$\sigma\theta 2 = \rho 2 \times V2 \quad (4)$$

Herein, $\rho 2$: the density of the reinforcing member 70A is satisfied.

For example, a case where the reinforcing member 70A is not included and the reinforcing member 70A is fixed to the internal gear 56 rotatable alone at the circumferential speed V1=80 (m/s) and is rotated at the circumferential speed V2=130 (m/s) is assumed. In this case, a deformation amount $\varepsilon 2$ of the reinforcing member 70A caused by the circumferential stress $\sigma\theta2$ generated at the reinforcing member 70A at the circumferential speed V2=130 (m/s) may be the same level as the deformation amount $\varepsilon1$ caused by the internal gear 56 alone at the circumferential speed V1=80 (m/s) ($\varepsilon2=\varepsilon1$). The deformation amount $\varepsilon2$ of the reinforcing member 70A is expressed by the following equation (5).

$$\varepsilon2=(\sigma\theta1+\sigma\theta2)/E2$$

$$=(t1/t2\times\rho1+\rho2)\times(V2)2/E2 \quad (5)$$

Based on the equations (1) and (5), a specific elastic modulus $E2/\rho2$ satisfying the following equation (6) may be sufficient to satisfy $\varepsilon2=\varepsilon1$.

$$E2/(t1/t2\times\rho1+\rho2)=E1/\rho1\times(V2/V1)2 \quad (6)$$

For example, when $\rho2=0.2\times\rho1$ and t1/t2=1, the specific elastic modulus $E2/\rho2$ required for the reinforcing member 70A is expressed by the following equation (7).

$$E2/\rho2=15.8\times E1/\rho1 \quad (7)$$

Based on the equation (7), the elastic modulus E2 required for the reinforcing member 70A is expressed by the following equation (8).

$$E2=15.8\times\rho2/\rho1\times E1$$

$$=15.8\times0.2\times E1$$

$$=3.16\times E1 \quad (8)$$

For example, when the internal gear 56 is made of steel, examples of the material for the reinforcing member 70A having the elastic modulus E2 calculated as described above include carbon fiber reinforced plastic.

In addition, a strength (allowable stress) required for the reinforcing member 70A will be examined.

When the allowable stress of a material for the internal gear 56 is $\sigma1$ and the allowable stress of the material for the reinforcing member 70A is $\sigma2$, the following equation (9) is established to make strains at allowable stresses an equal level ($\varepsilon2=\varepsilon1$).

$$\sigma2/E2=\sigma1/E1 \quad (9)$$

Based on the equation (9), the allowable stress $\sigma2$ of the material for the reinforcing member 70A preferably satisfies the following equation (10).

$$\sigma2=\sigma1\times E2/E1 \quad (10)$$

When assuming based on an example of the equation (8) above, the equation (10) is as follows.

$$\sigma2=\sigma1\times E2/E1$$

$$=\sigma1\times3.16.$$

That is, the reinforcing member 70A requires an allowable stress three times that of the internal gear 56.

For example, when the internal gear 56 is made of steel, examples of the material for the reinforcing member 70A having the allowable stress $\sigma2$ calculated as described above include carbon fiber reinforced plastic. Therefore, it can be seen that the material for the reinforcing member 70A is preferably carbon fiber reinforced plastic when the internal gear 56 is formed of a metal material.

Action Effect

In the planetary gear mechanism 5A having the configuration of the present embodiment, the reinforcing member 70A that is formed of a material having a higher specific strength than that of the material forming the internal gear 56 and has an annular shape is fixed to an outer peripheral surface of the internal gear 56. Such a reinforcing member 70A has a small deformation amount compared to the internal gear 56. Therefore, in the planetary gear mechanism 5A of the present embodiment, the deformation of the internal gear 56 caused by the centrifugal force generated when the internal gear 56 rotates at a high speed is suppressed by the reinforcing member 70A. Specifically, when the reinforcing member 70A is formed of a material having a specific strength that is equal to or lower than that of the material forming the internal gear 56, the diameter of the reinforcing member 70A increases by the deformation amount that is equal to or larger than that of the internal gear 56 due to centrifugal force. On the other hand, by forming the reinforcing member 70A of a material having a higher specific strength than that of the material forming the internal gear 56 as in the present embodiment, the deformation amount of the expanding reinforcing member 70A is smaller than that of the internal gear 56 even when the centrifugal force acts. As a result, the deformation of the internal gear 56, which is expanding to the outside Dro in the radial direction Dr due to the centrifugal force, can be effectively suppressed by the reinforcing member 70A. Therefore, the deformation of the internal gear 56 caused by the centrifugal force can be effectively suppressed, and a state where the internal gear 56 and the plurality of planetary gears 53 mesh with each other can be maintained in a stable state regardless of the rotation speed. As a result, the planetary gear mechanism 5A that can respond to rotation at a high speed can be provided.

In addition, by forming the reinforcing member 70A of a material having a higher elastic modulus than that of the internal gear 56 or a material having a lower density than that of the internal gear 56, difficulty of deformation is relatively increased with respect to the internal gear 56. As a result, an increase in the deformation amount of the reinforcing member 70A can be suppressed compared to the internal gear 56. Therefore, the deformation of the internal gear 56 caused by the centrifugal force can be effectively suppressed.

In addition, the internal gear 56 is formed of a metal material. Forming the internal gear 56 of a metal material can increase a strength compared to a case of forming the internal gear of a resin material. As a result, the deformation of the internal gear 56 caused by the centrifugal force can be suppressed. Therefore, when using the planetary gear mechanism 5A rotating at a high speed, it is preferable to form the internal gear 56 of a metal material. When using the planetary gear mechanism 5A in a high rotation speed range as described above, the deformation of the internal gear 56 made of a metal, which is caused by the centrifugal force, can also be effectively suppressed by using the reinforcing member 70A formed of a material having a high specific strength.

In addition, light weight and high strength can be ensured by forming the reinforcing member 70A of carbon fiber reinforced plastic. In particular, in the present embodiment, it is preferable to form the reinforcing member 70A so that the fiber direction Df (extension direction) of the fiber 70f constituting carbon fiber reinforced plastic coincides with the circumferential direction Dc having the first central axis O1 as reference. By forming the reinforcing member 70A as described above, extension of the reinforcing member 70A in a direction intersecting the circumferential direction Dc can be suppressed. Therefore, an increase in the deformation amount of the reinforcing member 70A in the radial direction Dr caused by the centrifugal force can be suppressed.

In addition, the reinforcing member 70A is formed in the region where at least a part overlaps the plurality of planetary gears 53 in the axial direction Da. Accordingly, deformation of the internal gear 56 in a region where the planetary gear 53 and the internal gear 56 mesh with each other can be mainly suppressed. Therefore, the deformation of the internal gear 56 can be efficiently suppressed.

In addition, during the rated operation of the compressor 3, the transmission mechanism 4 of the present embodiment rotates the sun shaft 58 so that the speed of the sun shaft increases to a rotation speed of approximately 10,000 (rotation/min) or more and 100,000 (rotation/min) or less. When the transmission mechanism 4 is driven in such a high rotation speed range, the rotation speed of the internal gear 56 also increases considerably. As a result, an effect of the deformation of the internal gear 56 caused by the centrifugal force increases, but occurrence of a defect in a state where the internal gear 56 and the planetary gear 53 mesh with each other can be effectively suppressed for a long period of time by suppressing the deformation of the internal gear 56 with the reinforcing member 70A. Therefore, the sun shaft 58, which is the output shaft, can be stably rotated at a high speed.

In addition, in a case where the transmission mechanism 4 is driven in the high rotation speed range, when the planetary gear mechanism 5A is used, a gear tangential force acting on the sun shaft 58 rotating at a high speed acts to cancel each other from the plurality of planetary gears 53. As a result, the load of the gear tangential force hardly acts on a bearing supporting the sun shaft 58. As a result, the size of the bearing supporting the sun shaft 58 can be decreased, and the transmission mechanism 4 that is usable in the high rotation speed range can be made small.

As described above, the compressor 3 rotating at a high speed compresses a hydrogen gas. Since the compressors 3 can respond to rotation at a high speed due to the planetary gear mechanism 5A having the internal gear 56 reinforced by the reinforcing member 70A, the hydrogen gas can be efficiently compressed.

In addition, the rotary mechanical system 1 further includes the driving machine 2 that is connected to the auxiliary shaft 51 and drives the compressor 3. The rotary mechanical system 1 transmits a rotary drive force of the driving machine 2 to the compressor 3 via the planetary gear mechanism 5A. In such a configuration, as the planetary gear mechanism 5A that can effectively suppress the deformation of the internal gear 56 caused by the centrifugal force is included, the compressors 3 can respond to rotation at a high speed.

Second Embodiment

Next, a second embodiment of the planetary gear mechanism and the rotary mechanical system according to the present disclosure will be described. In the second embodiment to be described below, the same reference numerals are given in the drawings to the configurations common to the first embodiment, and descriptions thereof will be omitted. In the second embodiment, a configuration of a reinforcing member 70B is different from the first embodiment.

Figure 5:
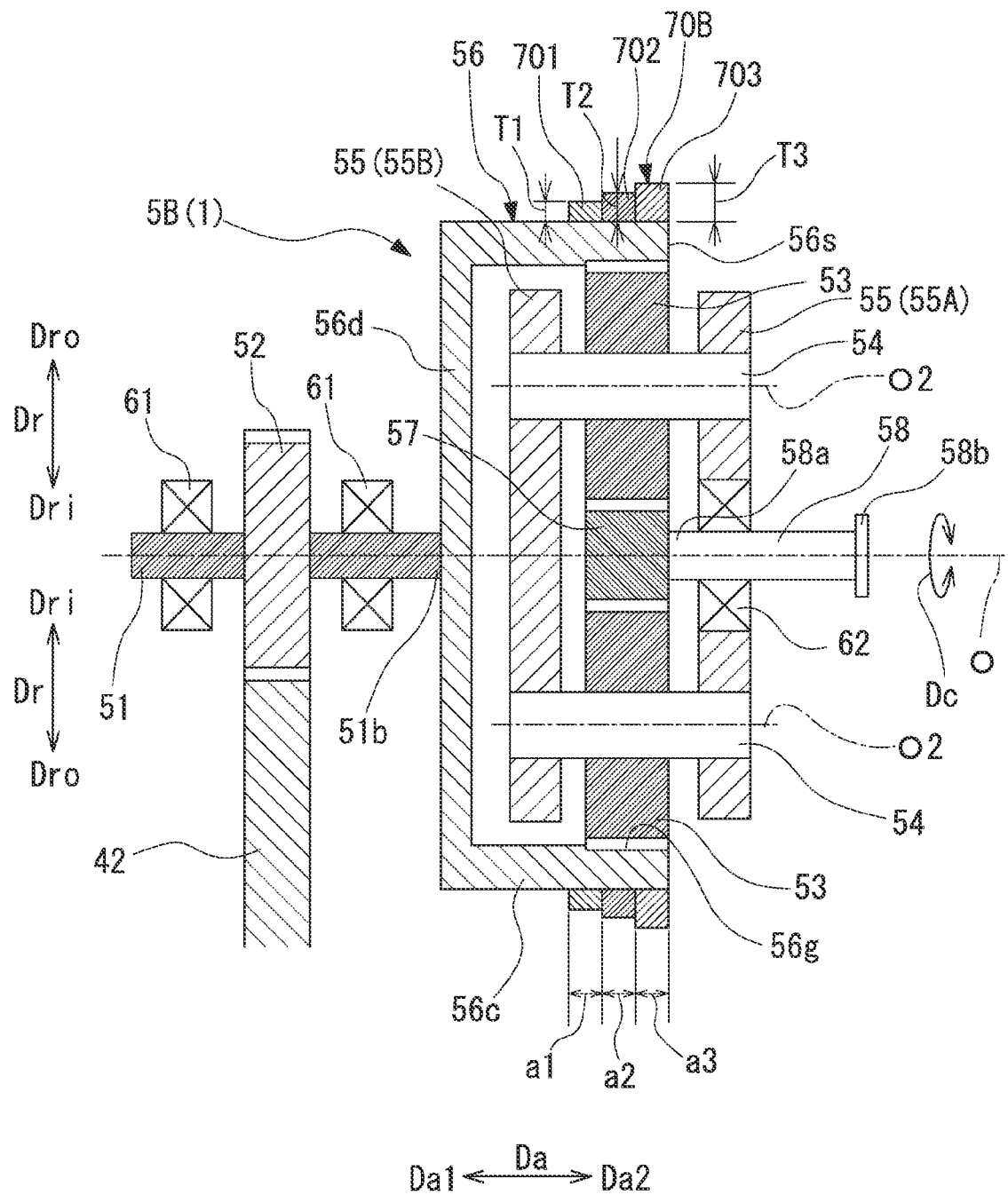
FIG. 5 is a schematic view showing a schematic configuration of a planetary gear mechanism of a rotary mechanical system according to a second embodiment of the present disclosure.

As shown in FIG. 5, the reinforcing member 70B of a planetary gear mechanism 5B of the second embodiment has a different thickness according to a position in the axial direction Da. In the reinforcing member 70B, a region closer to the opening end 56s in the axial direction Da than t other region is defined as a region having a large thickness in the radial direction Dr. In the second embodiment, from the first side Da1 toward the second side Da2 in the axial direction Da, the thickness of the reinforcing member 70B in the radial direction Dr gradually increases. From the first side Da1 toward the second side Da2 in the axial direction Da, the thickness of the reinforcing member 70B in the radial direction Dr may increase to change continuously.

In the present embodiment, an outer diameter of the reinforcing member 70B increases in three stages from the first side Da1 toward the second side Da2 in the axial direction Da. The reinforcing member 70B has, for example, a first reinforcing portion 701, a second reinforcing portion 702, and a third reinforcing portion 703. The first reinforcing portion 701, the second reinforcing portion 702, and the third reinforcing portion 703 are formed of the same material to have the same elastic modulus and density. The first reinforcing portion 701, the second reinforcing portion 702, and the third reinforcing portion 703 may be fixed to each other to be integrated with each other or may be separated from each other to be separable from each other.

The thickness of the first reinforcing portion 701 in the radial direction Dr will be defined as T1, the thickness of the second reinforcing portion 702 in the radial direction Dr will be defined as T2, and the thickness of the third reinforcing portion 703 in the radial direction Dr will be defined as T3. The thickness T1, the thickness T2, and the thickness T3 satisfy a relationship of $T1<T2<T3$.

Herein, based on the deformation amount (strain) $\varepsilon 1$ in a state of the internal gear 56 being alone without including the reinforcing member 70B, the thickness of the reinforcing member 70B is defined. For example, in the axial direction Da, a deformation amount (strain) of the internal gear 56 in a state where the first reinforcing portion 701 is not included in a region a1 where the first reinforcing portion 701 is to be disposed is defined as $\varepsilon 11$. In addition, in the axial direction Da, a deformation amount of the internal gear 56 in a state where the second reinforcing portion 702 is not included in a region a2 where the second reinforcing portion 702 is to be disposed is defined as $\varepsilon 12$. In addition, in the axial direction Da, a deformation amount of the internal gear 56 in a state where the third reinforcing portion 703 is not included in a region a3 where the third reinforcing portion 703 is to be disposed is defined as $\varepsilon 13$. A circumferential stress is generated in the reinforcing member 70B due to the deformation amount $\varepsilon 1$ of the internal gear 56. The deformation amount (strain) $\varepsilon 2$ of the reinforcing member 70B caused by the circumferential stress has a relationship of the following equation (11).

$$\varepsilon 2 \square \varepsilon 1/(E2 \times t2) \tag{11}$$

Therefore, when the first reinforcing portion 701, the second reinforcing portion 702, and the third reinforcing portion 703 are formed of the same material, the deformation amount of the internal gear 56 in each of the regions a1, a2, and a3 can be uniform by changing the plate thickness of the reinforcing member 70B according to the deformation amount of each of the regions a1, a2, and a3.

Further, when the deformation amount $\varepsilon 13$ of the internal gear 56 in the region a3 where the third reinforcing portion 703 is to be disposed is 1.0, the thickness T1 of the first reinforcing portion 701 preferably satisfies $T3 \times \varepsilon 11$. Similarly, when the deformation amount $\varepsilon 13$ of the internal gear 56 in the region a3 where the third reinforcing portion 703 is to be disposed is 1.0, the thickness T2 of the second reinforcing portion 702 preferably satisfies $T3 \times \varepsilon 12$.

Action Effect

In the planetary gear mechanism 5B and the rotary mechanical system 1 having the configuration, the reinforcing member 70B is formed so that the thickness in the radial direction Dr gradually increases as approaching the opening end 56s in the axial direction Da. The deformation amount of the internal gear 56 in the radial direction Dr caused by the centrifugal force increases as approaching the opening end 56s while separating away from the disk-shaped portion 56d in the axial direction Da. On the contrary, by increasing the thickness of the reinforcing member 70B in the radial direction Dr as approaching the opening end 56s in the axial direction Da, the deformation amount of the reinforcing member 70B can be decreased as approaching the opening end 56s. Accordingly, a restraining force generated by the reinforcing member 70B can be increased as approaching the opening end 56s. Therefore, the deformation of the internal gear 56 can be suppressed to be close to uniform in the axial direction Da. As a result, the planetary gear mechanism 5B that can effectively suppress the deformation of the internal gear 56 caused by the centrifugal force and can respond to rotation at a high speed can be provided.

Third Embodiment

Next, a third embodiment of the planetary gear mechanism and the rotary mechanical system according to the present disclosure will be described. In the third embodiment to be described below, the same reference numerals are given in the drawings to the configurations common to the first embodiment, and descriptions thereof will be omitted. In the third embodiment, a configuration of a reinforcing member 70C is different from the first embodiment and the second embodiment.

Figure 6:
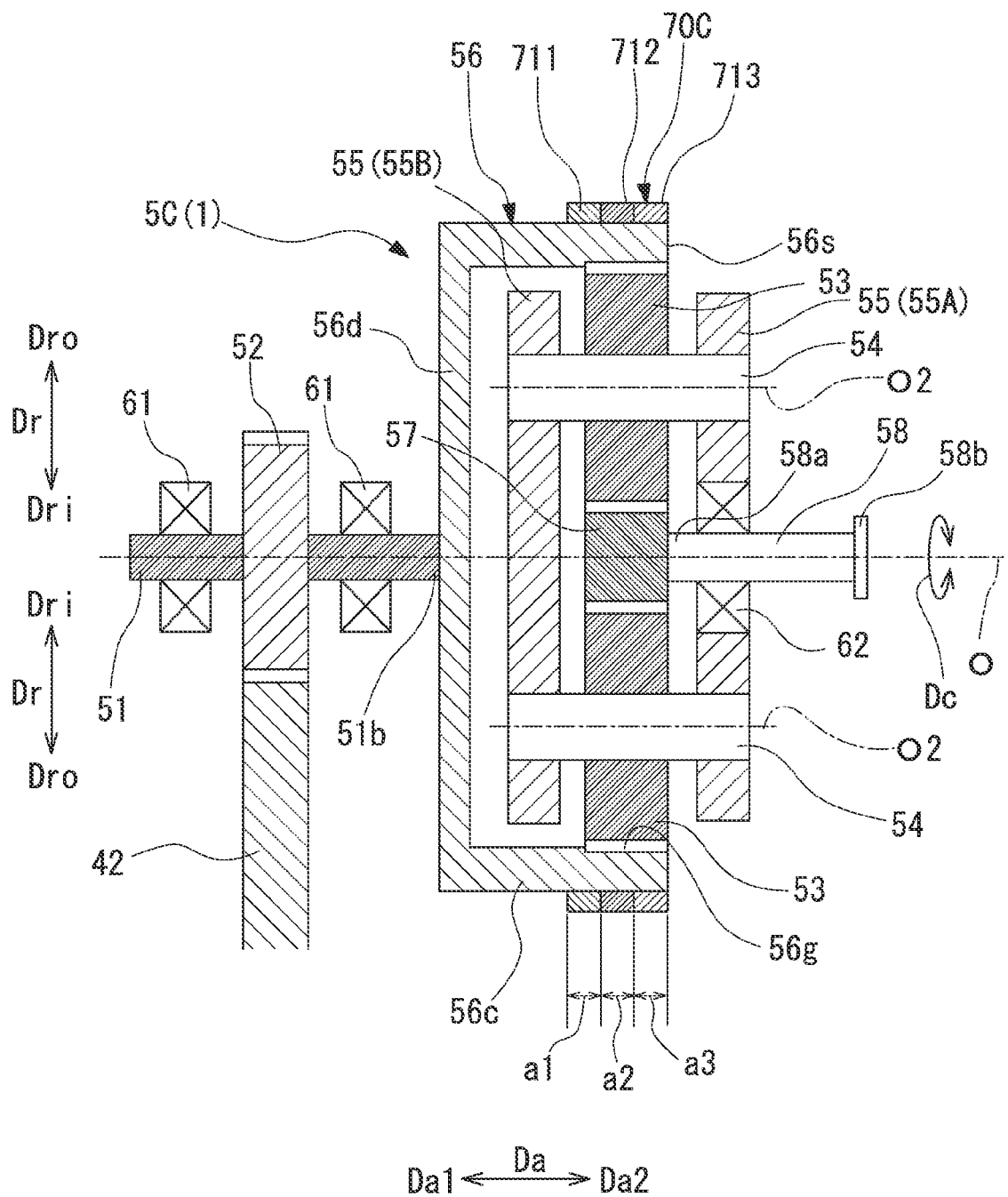
FIG. 6 is a schematic view showing a schematic configuration of a planetary gear mechanism of a rotary mechanical system according to a third embodiment of the present disclosure.

As shown in FIG. 6, the reinforcing member 70C of a planetary gear mechanism 5C of the third embodiment has a different elastic modulus of a material forming the reinforcing member 70C in the axial direction Da. In the reinforcing member 70C, a region closer to the opening end 56s in the axial direction Da than the other region is defined as a region in which an elastic modulus of the material forming the reinforcing member 70C is higher than the other region. In the present embodiment, from the first side Da1 toward the second side Da2 in the axial direction Da, the elastic modulus of the material forming the reinforcing member 70C gradually increases. From the first side Da1 toward the second side Da2 in the axial direction Da, the elastic modulus of the material forming the reinforcing member 70C may increase to change continuously.

In the present embodiment, the elastic modulus of the material for the reinforcing member 70C increases in three stages from the first side Da1 toward the second side Da2 in the axial direction Da. The reinforcing member 70C has, for example, a first reinforcing portion 711, a second reinforcing portion 712, and a third reinforcing portion 713. The first reinforcing portion 711, the second reinforcing portion 712, and the third reinforcing portion 713 are formed of different materials and have the same thickness in the radial direction Dr. The first reinforcing portion 711, the second reinforcing portion 712, and the third reinforcing portion 713 may be fixed to each other to be integrated with each other or may be separated from each other to be separable from each other.

The elastic modulus of the first reinforcing portion 711 in the radial direction Dr will be defined as E1, the elastic modulus of the second reinforcing portion 712 in the radial direction Dr will be defined as E2, and the elastic modulus of the third reinforcing portion 713 in the radial direction Dr will be defined as E3. The elastic modulus E1, the elastic modulus E2, and the elastic modulus E3 satisfy a relationship of E1<E2<E3.

Herein, as in the second embodiment, a circumferential stress is generated in the reinforcing member 70C due to the deformation amount ε1 of the internal gear 56. The deformation amount (strain) ε2 of the reinforcing member 70A caused by the circumferential stress has a relationship of the equation (11) described above. Therefore, when the first reinforcing portion 711, the second reinforcing portion 712, and the third reinforcing portion 713 are formed to have the same thickness, the deformation amount of the internal gear 56 in each of the regions a1, a2, and a3 can be uniform by changing the elastic modulus of the material forming the reinforcing member 70C according to the deformation amount of each of the regions a1, a2, and a3.

When the deformation amount ε13 of the internal gear 56 in the region a3 where the third reinforcing portion 713 is to be disposed is 1.0, the elastic modulus E1 of a material forming the first reinforcing portion 711 preferably satisfies E3×ε11. Similarly, when the deformation amount ε13 of the internal gear 56 in the region a3 where the third reinforcing portion 713 is to be disposed is 1.0, the elastic modulus E2 of a material forming the second reinforcing portion 712 preferably satisfies E3×ε12.

Action Effect

The planetary gear mechanism 5C and the rotary mechanical system 1 having the configuration are formed so that the elastic modulus of the material forming the reinforcing member 70C gradually increases as approaching the opening end 56s in the axial direction Da. The deformation amount of the internal gear 56 in the radial direction Dr caused by the centrifugal force increases as approaching the opening end 56s while separating away from the disk-shaped portion 56d in the axial direction Da. On the contrary, by increasing the elastic modulus of the material forming the reinforcing member 70C as approaching the opening end 56s in the axial direction Da, the deformation amount of the reinforcing member 70C can be decreased as approaching the opening end 56s. Accordingly, a restraining force generated by the reinforcing member 70C can be increased as approaching the opening end 56s. Therefore, the deformation of the internal gear 56 can be suppressed to be close to uniform in the axial direction Da. As a result, the planetary gear mechanism 5C that can effectively suppress the deformation of the internal gear 56 caused by the centrifugal force and can respond to rotation at a high speed can be provided.

Other Embodiments

As described above, the embodiments of the present disclosure are described in detail with reference to the drawings. However, the specific configurations are not limited to the embodiments and include a design modification or the like within a scope which does not depart from the gist of the present disclosure.

A configuration where the internal gear 56 includes the opening end 56s on the second side Da2 in the axial direction Da is adopted in the embodiments, without being limited thereto, for example, a configuration where the internal gear 56 includes opening ends on both sides in the axial direction Da may be adopted. In this case, it is preferable that the reinforcing members 70A to 70C include the internal gear 56 on each of both sides in the axial direction Da.

In addition, the configurations of the planetary gear mechanisms 5A to 5C are not limited to the configurations described in the embodiments and can be changed as appropriate.

In addition, although a configuration where the sun shaft 58, which is the second shaft, is the output shaft and the auxiliary shaft 51, which is the first shaft, is an input shaft is adopted in the embodiments, a configuration where the first shaft is the output shaft, and the second shaft is the input shaft may be adopted.

In addition, although the compressor is given as an example of the rotary machine constituting the rotary mechanical system 1 in the embodiments, there is no question about the application, configuration, and the like of the rotary machine at all. For example, the rotary machine may be a drive system, a wind turbine, or the like around a propeller shaft included in a ship or the like.

Additional Note

The planetary gear mechanisms 5A to 5C and the rotary mechanical system 1 described in the embodiments are understood, for example, as follows.

(1) The planetary gear mechanisms 5A to 5C according to a first aspect includes the sun gear 57 that is rotatable about the axis O1, the first shaft 58 that extends in the axial direction Da, is fixed to the sun gear 57, and is rotatable about the axis O1 with the sun gear 57, the axial direction Da is a direction in which extends the axis O1, the plurality of planetary gears 53 that mesh with the sun gear 57 and are rotatable about the center line O2 parallel to the axis O1, the internal gear 56 that is disposed outside in the radial direction Dr with respect to the plurality of planetary gears 53, includes the internal teeth 56g facing inside in the radial direction Dr and mesh with the planetary gear 53, and is rotatable about the axis O1, the second shaft 51 that extends in the axial direction Da, is connected to the internal gear 56, and rotates about the axis O1 in union with the internal gear 56, and the reinforcing members 70A to 70C that are fixed to the outer peripheral surface of the internal gear 56 and are formed in an annular shape of a material having a higher specific strength than that of the material forming the internal gear 56.

Accordingly, the reinforcing members 70A to 70C have a small deformation amount compared to the internal gear 56. Therefore, in the planetary gear mechanisms 5A to 5C, the deformation of the internal gear 56 caused by the centrifugal force generated when the internal gear 56 rotates at a high speed is suppressed by the reinforcing members 70A to 70C. Specifically, when the reinforcing member 70A is formed of a material having a specific strength that is equal to or lower than that of the material forming the internal gear 56, the diameters of the reinforcing members 70A to 70C increase by the deformation amount that is equal to or larger than that of the internal gear 56 due to the centrifugal force. On the other hand, by forming the reinforcing members 70A to 70C of a material having a higher specific strength than that of the material forming the internal gear 56, the deformation amounts of the reinforcing members 70A to 70C expanding to the outside Dro in the radial direction Dr are smaller than that of the internal gear 56 even when the centrifugal force acts. As a result, the deformation of the internal gear 56 caused by the centrifugal force can be effectively suppressed by the reinforcing members 70A to 70C. Therefore, the deformation of the internal gear 56 caused by the centrifugal force can be effectively suppressed, and a state where the internal gear 56 and the plurality of planetary gears 53 mesh with each other can be maintained in a stable state regardless of the rotation speed. As a result, the planetary gear mechanisms 5A to 5C that can respond to rotation at a high speed can be provided.

(2) The planetary gear mechanisms 5A to 5C according to a second aspect are the planetary gear mechanisms 5A to 5C of (1), and the reinforcing members 70A to 70C are formed in a region where at least a part overlaps the plurality of planetary gears 53 in the axial direction Da.

Accordingly, the deformation of the internal gear 56 in the region where the planetary gear 53 and the internal gear 56 mesh with each other can be mainly suppressed. Therefore, the deformation of the internal gear 56 can be efficiently suppressed.

(3) The planetary gear mechanism 5B according to a third aspect is the planetary gear mechanism 5B of (1) or (2), the internal gear 56 has the opening end 56s at one end in the axial direction Da, and in the reinforcing member 70B, a region closer to the opening end 56s in the axial direction Da than t other region is defined as a region having a large thickness in the radial direction Dr.

Accordingly, the deformation amount of the internal gear 56 caused by the centrifugal force increases as approaching the opening end 56s in the axial direction Da. On the contrary, by increasing the thickness of the reinforcing member 70B in the radial direction Dr as approaching the opening end 56s in the axial direction Da, the deformation amount of the reinforcing member 70B can be decreased as approaching the opening end 56s. Accordingly, a restraining force generated by the reinforcing member 70B can be increased as approaching the opening end 56s. Therefore, the deformation of the internal gear 56 can be suppressed to be close to uniform in the axial direction Da. As a result, the planetary gear mechanism 5B that can effectively suppress the deformation of the internal gear 56 caused by the centrifugal force and can respond to rotation at a high speed can be provided.

(4) The planetary gear mechanism 5C according to a fourth aspect is the planetary gear mechanism 5C of any one of (1) to (3), the internal gear 56 has the opening end 56s at the one end in the axial direction Da, and in the reinforcing member 70C, a region closer to the opening end 56s in the axial direction Da than the other region is defined as a region in which an elastic modulus of the material forming the reinforcing member 70C is higher than the other region.

Accordingly, the deformation amount of the internal gear 56 caused by the centrifugal force increases as approaching the opening end 56s in the axial direction Da. On the contrary, by increasing the elastic modulus of the material forming the reinforcing member 70C as approaching the opening end 56s in the axial direction Da, the deformation amount of the reinforcing member 70C can be decreased as approaching the opening end 56s. Accordingly, a restraining force generated by the reinforcing member 70C can be increased as approaching the opening end 56s. Therefore, the deformation of the internal gear 56 can be suppressed to be close to uniform in the axial direction Da. As a result, the planetary gear mechanism 5C that can effectively suppress the deformation of the internal gear 56 caused by the centrifugal force and can respond to rotation at a high speed can be provided.

(5) The rotary mechanical system 1 according to a fifth aspect includes the planetary gear mechanisms 5A to 5C of any one of (1) to (4) and the rotary machine 3 connected to any one of the first shaft 58 and the second shaft 51.

As the rotary mechanical system 1 includes the planetary gear mechanisms 5A to 5C that can effectively suppress the deformation of the internal gear 56 caused by the centrifugal force, the rotary machine 3 can respond to rotation at a high speed.

(6) The rotary mechanical system 1 according to a sixth aspect is the rotary mechanical system 1 of (5), the rotary machine 3 is the compressor 3 connected to the first shaft 58, and the rotary mechanical system further includes the driving machine 2 that is connected to the second shaft 51 and drives the compressor 3.

The rotary mechanical system 1 transmits a rotary drive force of the driving machine 2 to the compressor 3 via the planetary gear mechanisms 5A to 5C. In such a configuration, as the planetary gear mechanisms 5A to 5C that can effectively suppress the deformation of the internal gear 56 caused by the centrifugal force are included, the compressor 3 can respond to rotation at a high speed.

INDUSTRIAL APPLICABILITY

In the planetary gear mechanism and the rotary mechanical system of the present disclosure, deformation caused by the centrifugal force of the internal gear can be effectively suppressed, and rotation at a high speed can be responded.

EXPLANATION OF REFERENCES

1: rotary mechanical system
2: driving machine
21: drive shaft
3: compressor (rotary machine)
31: first compressor
32: second compressor
4: transmission mechanism
40: casing
41: main shaft
42: main gear
43: main shaft bearing
5A to 5C: planetary gear mechanism
5Ap: first planetary gear mechanism
5Aq: second planetary gear mechanism
51: auxiliary shaft
51b: end portion
52: auxiliary gear
53: planetary gear
54: planetary gear shaft
55: gear support portion
55A: first gear support portion
55B: second gear support portion
56: internal gear
56c: cylindrical portion
56d: disk-shaped portion
56g: internal teeth
56s: opening end
57: sun gear
58: sun shaft
58a: end portion
58b: end portion
61: first bearing
62: second bearing
70A to 70C: reinforcing member
70f: fiber
701: first reinforcing portion
702: second reinforcing portion
703: third reinforcing portion
711: first reinforcing portion
712: second reinforcing portion
713: third reinforcing portion
Da: axial direction
Da1: first side
Da2: second side
Dc: circumferential direction
Dr: radial direction
Dri: inside
Dro: outside
Df: fiber direction
L1: region
O: main axis
O1: first central axis (axis)
O2: second central axis (center line)
T1: thickness
T2: thickness
T3: thickness
a1: region
a2: region
a3: region

What is claimed is:

1. A planetary gear mechanism comprising:
a sun gear that is rotatable about an axis;
a first shaft that extends in an axial direction, is fixed to the sun gear, and is rotatable about the axis with the sun gear, wherein the axial direction is a direction in which the axis extends;
planetary gears that mesh with the sun gear and are each rotatable about a center line of each of the planetary gears parallel to the axis;
an internal gear that is disposed outside in a radial direction with respect to the planetary gears includes internal teeth facing inside in the radial direction and meshing with each of the planetary gears, and is rotatable about an axis of the internal gear;
a second shaft that extends in the axial direction, is connected to the internal gear, and rotates about the axis of the internal gear in unison with the internal gear; and
a reinforcing member that is fixed to an outer peripheral surface of the internal gear and is formed in an annular shape of a material having a higher specific strength than a specific strength of a material forming the internal gear, wherein
the internal gear has an opening end at one end in the axial direction,
the internal gear integrally has a cylindrical portion and a disk-shaped portion,
the disk-shaped portion extends from an end portion of the second shaft in the radial direction,
the cylindrical portion extends from an outer peripheral portion of the disk-shaped portion in the axial direction parallel to the axis,
the internal gear includes internal teeth that mesh with the planetary gears,
the internal teeth are formed partway through the cylindrical portion from the opening end toward the disk-shaped portion in the axial direction, and
the reinforcing member is formed to overlap, in the axial direction, an entire region where the internal gear and the planetary gears mesh with each other from the opening end, without covering an entire region of an outer peripheral surface of the cylindrical portion in the axial direction.

2. The planetary gear mechanism according to claim 1, wherein in the reinforcing member, a region closer to the opening end in the axial direction than a remaining region has a large thickness in the radial direction.

3. The planetary gear mechanism according to claim 1, wherein in the reinforcing member, a region closer to the opening end in the axial direction than a remaining region is made of a material that has an elastic modulus higher than the remaining region.

4. A rotary mechanical system comprising:

the planetary gear mechanism according to claim 1; and a rotary machine that is connected to any one of the first shaft and the second shaft.

5. The rotary mechanical system according to claim 4, wherein the rotary machine is a compressor connected to the first shaft, and the rotary mechanical system further comprises a driving machine that is connected to the second shaft and drives the compressor.

\* \* \* \* \*